United States Patent [19]

Bolan et al.

[11] Patent Number: 5,210,828
[45] Date of Patent: May 11, 1993

[54] MULTIPROCESSING SYSTEM WITH INTERPROCESSOR COMMUNICATIONS FACILITY

[75] Inventors: Timothy V. Bolan, Endwell; Josephine A. Boston, Endicott, both of N.Y.; George A. Fax, Rochester, Minn.; Donald J. Hanrahan, Endwell, N.Y.; Bernhard Laubli, Schönaich, Fed. Rep. of Germany; David A. Ring, Endicott; Alfred T. Rundle, Endwell, both of N.Y.; David J. Shippy, Austin, Tex.

[73] Assignee: International Business Machines Corporation, Armonk, N.Y.

[21] Appl. No.: 504,764

[22] Filed: Apr. 4, 1990

Related U.S. Application Data

[63] Continuation of Ser. No. 291,890, Dec. 29, 1988, abandoned.

[51] Int. Cl.$^5$ .............................................. G06F 13/14
[52] U.S. Cl. ............. 395/200; 364/DIG.1; 364/284; 364/284.3; 364/284.4; 364/247; 364/241.7
[58] Field of Search ............................ 395/200, 325

[56] References Cited

U.S. PATENT DOCUMENTS

| | | | |
|---|---|---|---|
| 4,164,787 | 8/1979 | Aranguren | 364/200 |
| 4,214,305 | 7/1980 | Tokita et al. | 364/200 |
| 4,276,594 | 6/1981 | Morley | 364/200 |
| 4,376,975 | 3/1983 | Comfort et al. | 364/200 |
| 4,387,441 | 6/1983 | Kocol et al. | 364/200 |
| 4,396,983 | 8/1983 | Segarra et al. | 364/200 |
| 4,404,628 | 9/1983 | Angelo | 395/200 |
| 4,415,972 | 11/1983 | Adcock | 364/200 |
| 4,426,679 | 1/1984 | Yu et al. | 364/200 |
| 4,488,231 | 12/1984 | Yu et al. | 364/200 |
| 4,494,185 | 1/1985 | Gunderson et al. | 364/200 |
| 4,571,672 | 2/1986 | Hatada et al. | 264/200 |
| 4,648,029 | 3/1987 | Cooper et al. | 364/200 |
| 4,665,482 | 5/1987 | Murray, Jr. et al. | 364/200 |
| 4,698,753 | 10/1987 | Hubbins et al. | 364/200 |
| 4,745,595 | 5/1988 | Muir et al. | 364/200 |
| 4,769,771 | 9/1988 | Lippmann et al. | 364/200 |
| 4,835,674 | 5/1989 | Collins et al. | 364/200 |
| 4,862,354 | 8/1989 | Fiacconi et al. | 364/200 |
| 4,866,664 | 9/1989 | Burkhardt, Jr. et al. | 364/200 |

FOREIGN PATENT DOCUMENTS

| | | |
|---|---|---|
| 0029975 | 6/1981 | European Pat. Off. |
| 0197499 | 10/1986 | European Pat. Off. |
| 0201020 | 12/1986 | European Pat. Off. |

OTHER PUBLICATIONS

"Message-Based Protocol for Interprocesor Communication" IBM TDB, vol. 22, No. 7, Dec. 1979.
Clements, "Multiprocessor Systems", Electronics & Wireless World, No. 1631, p. 875, Sep. 1988.
"Communication Mechanism Between a Service Processor and a Processor", IBM TDB, vol.28, No. 12, p. 5185, May 1986.
Faro et al., "A Multimicrocomputer-Based Structure for Computer Networking", IEEE Micro., vol. 5, No. 2, p. 53 Apr. 1985.

Primary Examiner—Michael R. Fleming
Assistant Examiner—Debra A. Chun
Attorney, Agent, or Firm—David S. Romney; Arthur J. Samodovitz

[57] ABSTRACT

A plurality of processors are connected to the interprocessor communications facility in the multiprocessing system of the invention. The interprocessor communications facility has arbitration circuitry, mailbox circuitry, and processor interrupt circuitry. The interprocessor communications facility of the invention is centralized and does not require the use of main storage. This enables processors to communicate with each other in a fast and efficient manner. The arbitration circuitry prevents simultaneous access of the interprocessor communications facility by more than one processor, and decodes the commands sent from the processors and routes them to the processor interrupt circuitry or to the mailbox circuitry, depending on the command. The mailbox circuitry of the invention receives messages from sending processors and provides them to the intended receiving processors in a safe and secure manner. The processor interrupt circuitry facilitates the interprocessor communications process by handling interprocessor interrupts.

4 Claims, 4 Drawing Sheets

FIG. 1 - SYSTEM STRUCTURE

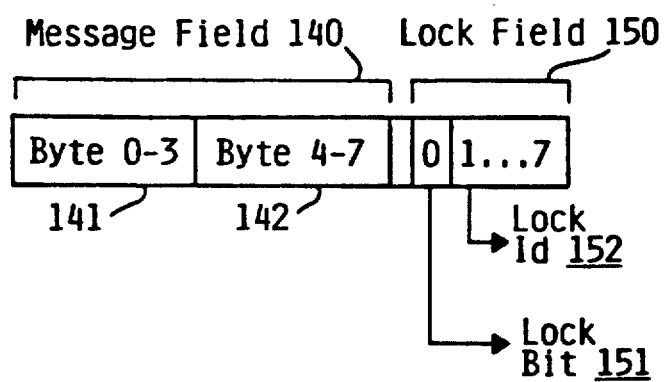
FIG. 4 - MAILBOX ENTRY

MULTIPROCESSING SYSTEM WITH INTERPROCESSOR COMMUNICATIONS FACILITY

This is a continuation of U.S. patent application Ser. No. 07/291,890 filed Dec. 29, 1988, now abandoned.

FIELD OF THE INVENTION

This invention relates to the data processing field. More particularly, this invention is a multiprocessing computer system having an efficient interprocessor communications facility.

BACKGROUND OF THE INVENTION

In a multiprocessing system, some mechanism usually exists to allow one processor to communicate with another processor. Typically, when one processor wants to send a message to another processor, it places messages and address pointers for interprocessor communications in main storage. Main storage must be accessed by both sending and receiving processors to perform this message transfer. This burdens the main storage and its associated circuitry, delaying other accesses to main storage and reducing overall system performance.

Another problem with the traditional approach of interprocessor communications is the difficulty of communicating with a special type of processor, such as a service processor, when all messages must go through main storage. The service processor performs a variety of diagnostic, maintenance and error recovery operations, and usually cannot write to main storage without quiescing the entire system. Therefore, a service processor could not send a message to another processor without bringing the whole system down, thereby limiting the ability of the service processor to perform error recovery operations.

Prior attempts to improve multiprocessing communications have been complex, inefficient, structured and rigid, and often require all processors to have identical cycle times and operate off of synchronized clock pulses. In addition, these prior attempts have not sufficiently addressed the problem of security and integrity of the interprocessor messages.

SUMMARY OF THE INVENTION

It is a principal object of the invention to provide a multiprocessing system with an efficient interprocessor communications facility.

It is another object of the invention to provide a multiprocessing system with an interprocessor communications facility that does not require the use of main storage.

It is another object of the invention to provide a multiprocessing system with an interprocessor communications facility that is flexible enough to be used by a diverse group of processors.

These and other objects are accomplished by the multiprocessing system with an interprocessor communications facility disclosed herein.

A plurality of processors are connected to the interprocessor communications facility in the multiprocessing system of the invention. The interprocessor communications facility has arbitration circuitry, mailbox circuitry, and processor interrupt circuitry. The interprocessor communications facility of the invention is centralized and does not require the use of main storage. This enables processors to communicate with each other in a fast and efficient manner. The arbitration circuitry prevents simultaneous access of the interprocessor communications facility by more than one processor, and decodes the commands sent from the processors and routes them to the processor interrupt circuitry or to the mailbox circuitry, depending on the command. The mailbox circuitry of the invention receives messages from sending processors and provides them to the intended receiving processors in a safe and secure manner. The processor interrupt circuitry facilitates the interprocessor communications process by handling interprocessor interrupts.

The mailbox circuitry contains a mailbox array having a plurality of mailbox entries. Each mailbox entry contains a message field and a lock field. Each lock field contains a lock bit and a lock ID. Each processor has a portion of mailbox entries reserved for its use.

The processors of the multiprocessing system communicate with the interprocessor communications facility of the invention through one or more commands.

The interprocessor communications facility of the invention can be accessed directly by a service processor, so the service processor can communicate with the other processors of the system without quiescing the entire system.

BRIEF DESCRIPTION OF THE DRAWING

FIG. 4 shows a mailbox entry of the subject invention in more detail.

DESCRIPTION OF THE PREFERRED EMBODIMENT

Figure 1:
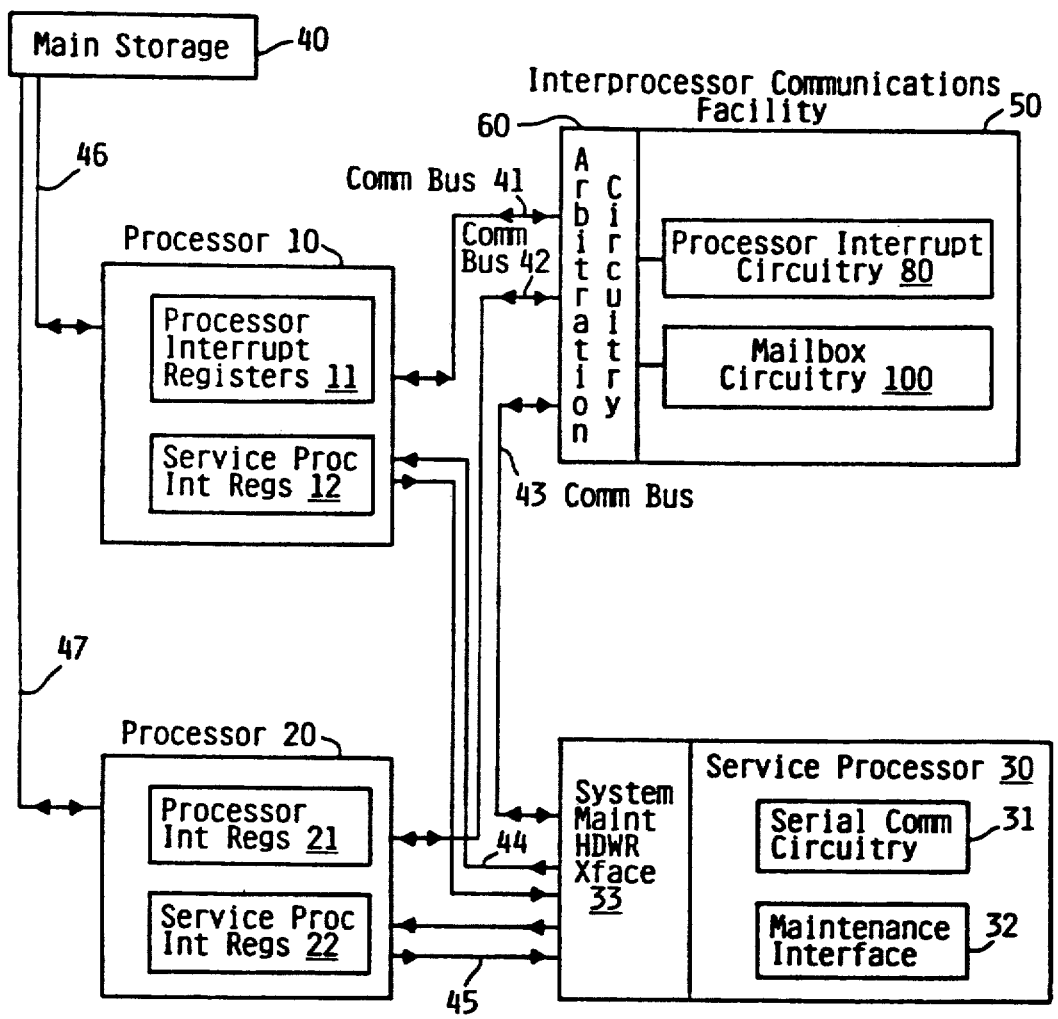
FIG. 1 shows a block diagram of the multiprocessing system of the subject invention.

FIG. 1 shows a block diagram of the multiprocessing system of the subject invention. Processor 10 is connected to interprocessor communications facility 50 via communications bus 41 and to main storage 40 via bus 46. Processor 20 is connected to interprocessor communications facility 50 via communications bus 42 and to main storage 40 via bus 47. Service Processor 30 is connected to interprocessor communications facility 50 via communications bus 43.

In the preferred embodiment, processor 10 is an Input/Output Processing Unit (IOPU), and processor 20 is an Instruction Processing Unit (IPU), although these processors could have other functions and still fall within the scope of the invention. Service Processor 30 performs various diagnostic, maintenance, and error recovery procedures and can initiate Initial Program Load, alter and display General Purpose Registers, alter and display the Program Status Word, alter and display main storage, among other things. Although lines 41–47 are all shown as direct connection busses, any other type of communication path could also be used.

Interrupts between processors 10 and 20 are handled by processor interrupt circuitry 80 of interprocessor communications facility 50 through processor interrupt registers 11 and 21, and will be discussed in more detail later. Due to the special nature of service processor 30, interrupts between service processor 30 and any other processor of the system are typically not handled by processor interrupt circuitry 80 of interprocessor communications facility 50. Instead, interrupts between service processor 30 and any other processor of the system are usually handled by service processor interrupt registers 12 and 22 and maintenance interface 32. In the preferred embodiment, service processor interrupt registers 12 and 22 are capable of storing four different interrupt conditions, as shown below in Table 1.

PROCESSOR TO SERVICE PROCESSOR INTERRUPT CONDITIONS

PROCESSOR TO SERVICE PROCESSOR INTERRUPT REQUEST
SERVICE PROCESSOR TO PROCESSOR INTERRUPT RESPONSE
SERVICE PROCESSOR TO PROCESSOR INTERRUPT REQUEST
PROCESSOR TO SERVICE PROCESSOR INTERRUPT RESPONSE

TABLE 1

Service processor 30 interrupts processor 10 via the SERVICE PROCESSOR TO PROCESSOR INTERRUPT REQUEST sent from maintenance interface 32 to service processor interrupt registers 12 via bus 44 and system maintenance hardware interface 33. In the preferred embodiment, system maintenance hardware interface 33 allows service processor 30 to be connected directly to the rest of the multiprocessing system. Service processor 30 then waits for a PROCESSOR TO SERVICE PROCESSOR INTERRUPT RESPONSE from service processor interrupt registers 12 to maintenance interface 32 via bus 44. Service processor 30 interrupts processor 20 in a similar manner, but via bus 45 and using service processor interrupt registers 22.

Processor 10 interrupts service processor 30 via the PROCESSOR TO SERVICE PROCESSOR INTERRUPT REQUEST sent from service processor interrupt registers 12 to maintenance interface 32 via bus 44. Processor 10 then waits for a SERVICE PROCESSOR TO PROCESSOR INTERRUPT RESPONSE from maintenance interface 32 to service processor interrupt registers 12 via bus 44. Processor 20 interrupts service processor 30 in a similar manner, but via bus 45 and using service processor interrupt register 22.

In the preferred embodiment, interrupts from service processor 30 to any other processor of the system can also be performed by processor interrupt circuitry 80 of interprocessor communications facility 50 in special cases, such as when service processor 30 wants to send an interrupt to all system processors via a single command. The capability to interrupt all processors is a unique capability of processor interrupt circuitry 80 and will be described in more detail later.

Arbitration Circuitry

Referring again to FIG. 1, interprocessor communications facility 50 contains arbitration circuitry 60, processor interrupt circuitry 80 and mailbox circuitry 100. Communications busses 41-43 provide the inputs to arbitration circuitry 60. Arbitration circuitry 60 is connected to processor interrupt circuitry 80 and mailbox circuitry 100.

Figure 2:
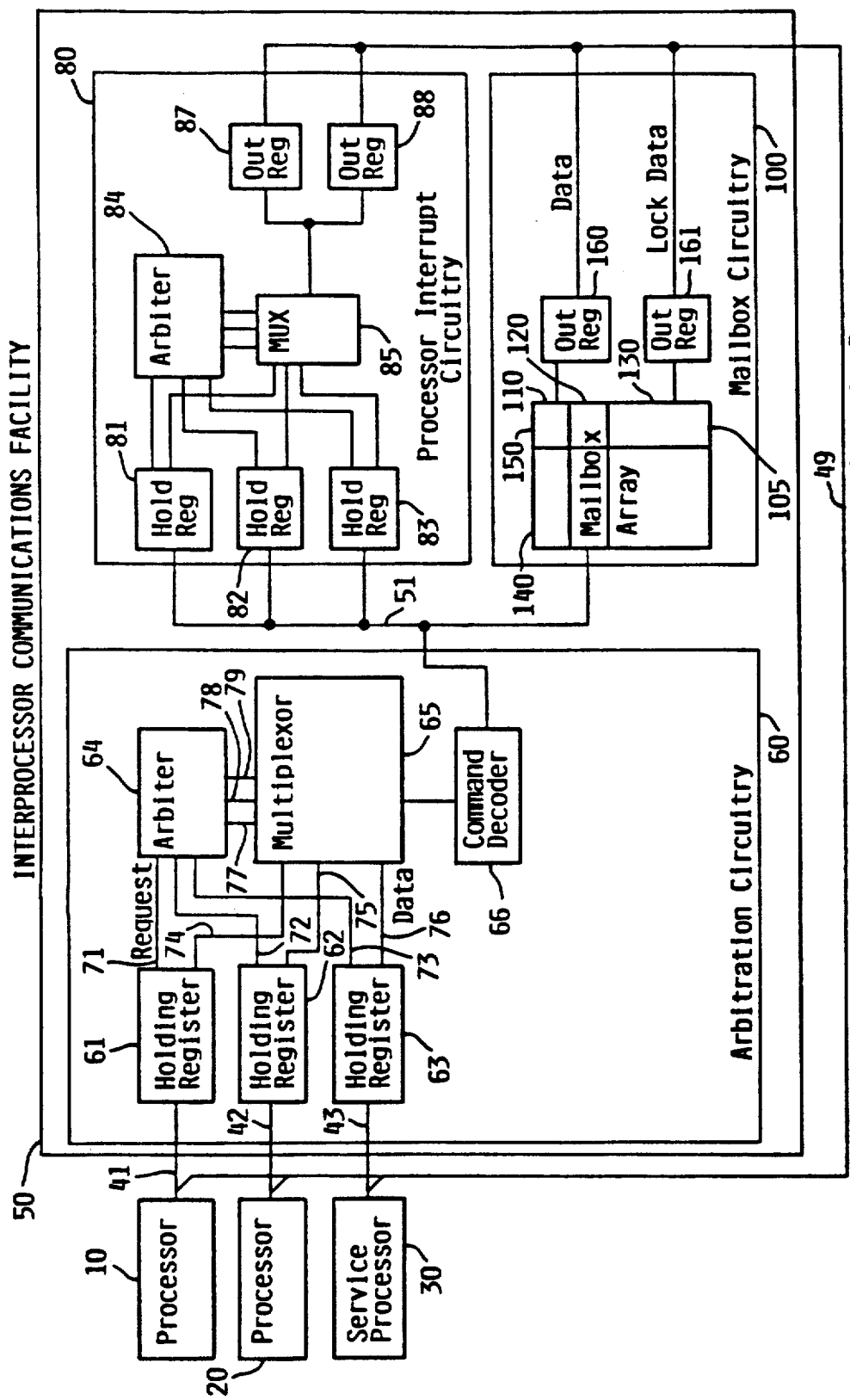
FIG. 2 shows a block diagram of the interprocessor communications facility of the subject invention.

FIG. 2 shows a block diagram of interprocessor communications facility 50 of the invention in more detail. Arbitration circuitry 60 prevents simultaneous access of interprocessor communications facility 50 by more than one processor. Arbitration circuitry 60 also decodes the commands sent from the processors and routes them either to processor interrupt circuitry 80 or to mailbox circuitry 100, depending on the command. Arbitration circuitry 60 is made up of holding registers 61-63, arbiter 64, multiplexor 65, and command decoder 66.

When processor 10 wants to communicate with processor 20 in the multiprocessing system, it sends information to holding register 61 via communications bus 41. The information contains a command, an address, and optionally data, such as a message, lock data or interrupt data. When holding register 61 contains information, a request signal is passed to arbiter 64 over request line 71, and the information is presented to the input of multiplexor 65 on data line 74. Arbiter 64 sends a control signal to multiplexor 65 on control line 77, instructing multiplexor 65 to take the information on data line 74 and provide it to command decoder 66. Command decoder 66 decodes the command and sends it either to processor interrupt circuitry 80 or to mailbox circuitry 100.

In the preferred embodiment, each command is composed of 5 bits, thereby permitting 2**5 = 32 commands. The command decoder decodes each command by creating a separate minterm expression for each 5 bit command. A minterm expression is a minimum set of bits that when ANDed together form one of all possibly logically true terms. This decoding operation can be performed by a simple logic circuit arranged using well known digital logic design techniques. The actual design of this circuit is dependent on the coding of the commands chosen by the designer. The logic circuit has one command decode line for each valid command. One command decode line becomes active when the command associated with that line is received by the circuit.

Of the possible 32 commands, 10 are valid or recognized by the decoder, while the remainder are reserved for future use. Any invalid command raises an error signal. The decoder sends out the minterm expressions (signals) to be used by the appropriate facility. A processor interrupt command is sent to processor interrupt circuitry 80. All other commands are sent to mailbox circuitry 100. These commands will be discussed in more detail later.

Figure 3:
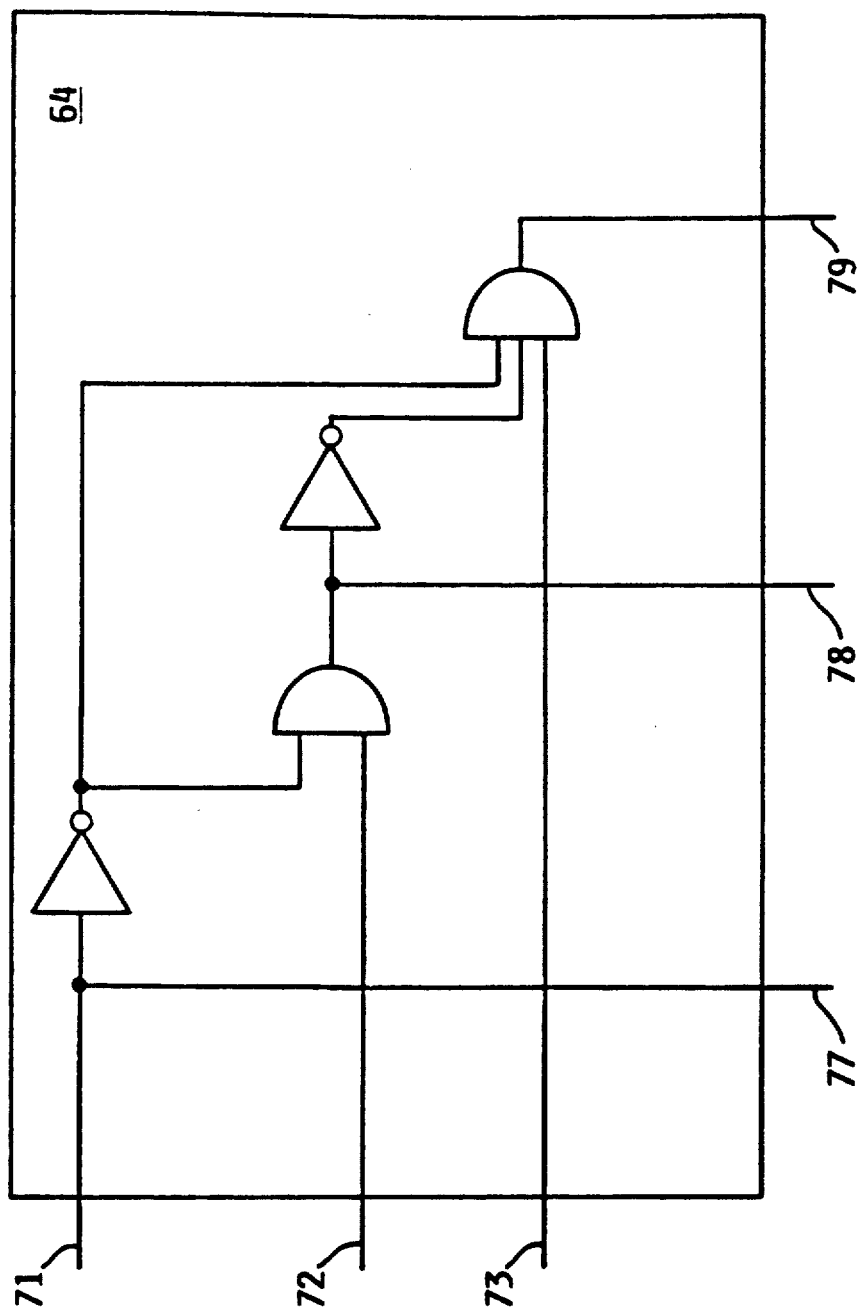
FIG. 3 shows the arbiter circuitry of the interprocessor communications facility of the subject invention in more detail.

FIG. 3 shows arbiter 64 of the preferred embodiment in more detail. If there is a signal present on request line 71 from holding register 61, command line 77 is activated, thereby instructing multiplexor 65 to take the information on data line 74 and provide it to command decoder 66. This is done even if there were simultaneously transmitted signals on request lines 72 and/or 73. Therefore, processor 10 is always given priority in arbiter 64 over processors 20 and 30.

If there is a signal present on request line 72 from holding register 62, but no signal on request line 71, command line 78 is activated, thereby instructing multiplexor 65 to take the information on data line 75 and provide it to command decoder 66. This is done even if there was a simultaneously transmitted signal on request line 73. Therefore, processor 20 is always given priority in arbiter 64 over processor 30, but not processor 10.

If there is a signal present on request line 73 from holding register 63, but no signal on request lines 71 or 72, command line 79 is activated, thereby instructing multiplexor 65 to take the information on data line 76 and provide it to command decoder 66. This is done only if there were no simultaneously transmitted signals on request lines 71 or 72.

If it is desired in a particular application to change the priority given to the processors, arbiter 64 can be easily modified by switching line 71-73 and 77-79 around. Arbiter 64 could also be modified to handle more complex priority schemes.

Mailbox Circuitry

Referring again to FIG. 2, mailbox circuitry 100 receives messages from sending processors and provides them to the intended receiving processors in a safe and secure manner. Mailbox circuitry 100 is made up of mailbox array 105, message output register 160 and lock output register 161. Mailbox array 105 contains mailbox portions 110, 120 and 130. Mailbox portions 110, 120 and 130 are reserved for the use of processors 10, 20, and 30, respectively, as will be explained in more detail later. Each mailbox portion contains one or more mailbox entries. Each mailbox entry contains message field 140 and lock field 150.

A mailbox entry is shown in more detail in FIG. 4. Message field 140 consists of 8 bytes of data in the preferred embodiment, although this field could be smaller or larger and still fall within the scope of the invention. Usually, these 8 bytes of data would be a message from one processor to another. However, in some instances, such as with asynchronous communications between processors using task control blocks, as will be explained in more detail later, message field 140 is broken up into message field segment 141 and message field segment 142. In this case, segment 141 contains the beginning address of a task control block located in main storage 40. Segment 142 contains the ending address of the task control block.

Lock field 150 contains lock bit 151 and lock ID 152. In the preferred embodiment, lock bit 151 is zero if the associated mailbox entry is not in use by a processor. If the mailbox entry is in use, lock bit 151 is one, and lock ID field 152 contains identification indicia of the processor using the mailbox entry.

Referring again to FIG. 2, Processor interrupt circuitry 80 facilitates the interprocessor communications process by handling interprocessor interrupts. Processor interrupt circuitry 80 is made up of holding registers 81-83, arbiter 84, multiplexor 85, and output registers 87-88. Arbiter 84 is substantially the same as arbiter 64, shown in more detail in FIG. 3, as has been discussed.

When command decoder 66 decodes a processor interrupt command, it sends the command on to processor interrupt circuitry 80. Note that processor interrupt circuitry 80 is substantially similar to arbitration circuitry 60. This is done to provide an additional holding area for processor interrupt commands, since processor interrupt commands can take longer to execute than the other commands which are sent to mailbox circuitry 100.

In the preferred embodiment, command decoder 66 uses four clock cycles, T0, T1, T2, and T3, to decode and execute a command. During T0, the command is decoded by command decoder 66 and one of the command decode lines becomes active. From here on, the exact sequence of control signals depends on the command being executed. For example, when a READ MESSAGE command is decoded, the address of the mailbox entry is gated to mailbox array 105. The array will access the addressed location and the message will be sent to output register 160, from which it is returned to the requesting processor. These steps are performed during clock cycles T1-T3.

The command decode lines are used to gate the T-clocks through the control logic to determine which operations are performed and when. For example, when the PROCESSOR INTERRUPT command is decoded, it will gate the T2 signal to the proper holding register (81, 82, or 83) to latch the address and data. Some operations are performed by more than one command, so several command decode lines may be ORed together to gate a T-clock. For example, several commands cause the lock field of a mailbox entry to be read. Those commands are joined together to read the lock field and latch the output data into output register (161).

The commands available for use by the processors of the multiprocessing system to facilitate interprocessor communications are shown below in Table 2.

MAILBOX CIRCUITRY COMMANDS
WRITE MESSAGE
READ MESSAGE
READ LOCK
WRITE LOCK
TEST AND SET LOCK
RESET LOCK
TEST AND SET LOCK AND READ MESSAGE
RESET LOCK AND WRITE MESSAGE
TEST AND SET LOCK AND WRITE MESSAGE

PROCESSOR INTERRUPT CIRCUITRY COMMAND

PROCESSOR INTERRUPT

TABLE 2

MAILBOX CIRCUITRY COMMANDS

Message Commands

The WRITE MESSAGE command is used by a processor who wants to send a message to another processor in the system. This command contains the message intended for another processor. In the preferred embodiment, this message can be up to eight bytes long, but this length could be different and still fall within the scope of the invention. The WRITE MESSAGE command also contains an address of a mailbox entry in mailbox array 105. This mailbox entry is within the message array portion reserved for the processor for which the message is intended. When this command is received by command decoder 66, the message is placed in message field 140 of the addressed mailbox entry.

The READ MESSAGE command is used by a processor who wants to read a message placed in one of its mailbox entries by another processor. This command contains the address of the mailbox entry that has the message the processor wants to read. When this command is received by command decoder 66, the message is retrieved from the addressed mailbox entry and placed in message output register 160, where it is sent on return line 49 to the processor who issued the command.

Lock Commands

The READ LOCK command is used by a processor who wants to read the data contained in the lock field of a mailbox entry. This command contains the address of the mailbox entry corresponding to the lock field the processor wants to read. When this command is received by command decoder 66, the data contained in lock field 150 of the addressed mailbox entry is retrieved from the addressed mailbox entry and placed in lock output register 161, where it is sent on return line 49 to the processor who issued the command.

The WRITE LOCK command is used by a processor who wants to write data to the lock field of a mailbox entry. This command contains the data the processor wants to write, along with the address of the mailbox entry corresponding to the lock field the processor wants to write. When this command is received by command decoder 66, the data is placed in the addressed mailbox entry in lock field 150.

If there is data in the array with bad parity, such as during power up, this command can be used to initialize the array.

The TEST AND SET LOCK command is used by a processor who wants to check a lock field of a mailbox entry to see if the mailbox entry is in use, and, if not, write data to the lock field. This command contains the data the processor wants to write, along with the address of the mailbox entry corresponding to the lock field the processor wants to write. When this command is received by command decoder 66, the most significant bit of the addressed lock field is checked. If the most significant bit of the lock field is zero, indicating that the mailbox entry is not in use, then the data from the processor is written into the lock field of the specified mailbox entry. This data in the preferred embodiment would be identification indicia of the processor making the request. By inserting this data in the lock field (and setting the most significant bit to one), the processor indicates that it is using this mailbox entry. If the most significant bit of the lock field is one, the write does not take place. In both cases, the data contained in the lock field before the command was received is placed in lock output register 161, where it is sent on the return line 49 to the processor who issued the command.

The RESET LOCK command is used by a processor who wants to indicate that it no longer is using a mailbox entry. This command contains the address of the mailbox entry no longer needed. When this command is received by command decoder 66, the most significant bit of the lock field corresponding to the addressed mailbox entry is reset to zero, indicating that the mailbox entry is not in use. If that bit were already a zero, no error is flagged. By convention, a processor would only use this command for mailbox entries it was using.

Combination Commands

In order to increase the efficiency of using these commands, combination commands made up of the commands shown above can be used by the processors of the multiprocessing system to facilitate interprocessor communications.

The TEST AND SET LOCK AND READ MESSAGE is used by a processor who wants to use both the TEST AND SET LOCK command and the READ MESSAGE command, as described above.

The RESET LOCK AND WRITE MESSAGE is used by a processor who wants to use both the RESET LOCK command and the WRITE MESSAGE command, as described above.

The TEST AND SET LOCK AND WRITE MESSAGE is used by a processor who wants to use both the TEST AND SET LOCK command and the WRITE MESSAGE command, as described above. Neither the lock write nor the message write takes place if the lock field indicates that the mailbox entry is in use.

PROCESSOR INTERRUPT CIRCUITRY COMMAND

The PROCESSOR INTERRUPT command is used by a processor that wants to set or reset a processor interrupt, including its own interrupt. This command contains the address of the targeted processor or processors and one byte of interrupt data that sets or resets a processor interrupt. In the preferred embodiment, this address is encoded to provide more function and flexibility. Encoding is used to compress the address field so that enough addresses are provided to address processors individually or as groups of processors. For example, address 1000 is processor 10 and address 1001 is processor 20. Address 1111 is the address for "All Processors" which includes both processor 10 and processor 20. When such a 'broadcast' address is used, processor interrupt circuitry 80 must send the data byte to all processors in that group and will wait until all have responded.

If, for example, processor 10 wants to send a byte of interrupt data to processor 20, it sends a processor interrupt command along with the address "1001" to holding register 61. Arbitration circuitry 60 presents the command to command decoder 66, who decodes the command and sends it and the interrupt data byte on to holding register 81 in processor interrupt circuitry 80. Processor interrupt circuitry 80 operates in a manner similar to arbitration circuitry 60, as has been discussed, and eventually places the interrupt byte in output register 88, the output register dedicated to processor 20. The interrupt byte is then sent on return line 49 back to processor 20.

Note that service processor 30 has a separate interrupt facility with processors 10 and 20 via service processor interfaces 12 and 22, as has been discussed, and is not addressable by processor interrupt circuitry 80. However, service processor 30 is able to originate a processor interrupt command and would do so in special cases, such as when it wants to send an interrupt to all system processors via a single command.

Although only processor 10 and processor 20 are shown in FIG. 1 as being addressable by processor interrupt circuitry 80, several additional processors, such as I/O processors, Instruction processors, or other type of processors, could be part of the multiprocessing system and could be addressable by processor interrupt circuitry 80. Any particular processor could be assigned to more than one group if desired. For example, one group could be implemented which includes "all processors" while another could be "all I/O processors". In this example, each I/O processor would be in both groups. If additional processors are added, corresponding additional holding registers and output registers would be added, and arbiters 64 and 84 would be modified slightly in a manner known to those skilled in the art.

Examples of Operation

Several examples of how the above commands can be used in the multiprocessing system of the invention will now be discussed.

Processor 10 to Processor 20 Synchronous

This example shows how the invention can be used to allow processor 10 to synchronously send a message to processor 20, and have processor 20 respond to the synchronous message, while processor 10 waits for the response from processor 20. Processor 10 issues a TEST AND SET LOCK AND WRITE MESSAGE command to the address of a mailbox entry in mailbox portion 120 reserved for synchronous communication with processor 20, and checks that the lock was obtained. If it was obtained, the data that was written to the mailbox entry contains the message information and the lock field contains the lock ID of processor 10. If the lock was not obtained, then processor 10 must wait for the mailbox entry to be unlocked. In addition, the lock bit is set to one, indicating that the mailbox entry is in use, thereby preventing all other processors from using synchronous communication with processor 20 until processor 10 has released the lock.

Next, processor 10 sends an interrupt to processor 20 indicating a synchronous message is in the mailbox waiting for processing. Processor 10 uses the PROCESSOR INTERRUPT command to set the synchronous interrupt bit in processor 20. Processor 20 will soon detect the interrupt and will realize that a message is waiting in the mailbox. Processor 20 then will use a READ MESSAGE command to get the message. Processor 20 then uses the PROCESSOR INTERRUPT command to reset the interrupt that is being processed. Processor 20 dedicates its resources to process this message, and places the message response back in the mailbox array at the address of a mailbox entry located in mailbox array portion 110 reserved for synchronous responses to processor 10 with a WRITE MESSAGE command. Since the message handling is now complete, processor 20 indicates this with a PROCESSOR INTERRUPT command to set the response interrupt bit in processor 10. Since processor 20 has completed the message handling, it can now proceed with other tasks.

Meanwhile, processor 10 detects the response interrupt bit, signalling that processor 20 has completed the message handling and the response is in the mailbox array. Processor 10 obtains the response by executing a READ MESSAGE command followed by a RESET LOCK command. The message response is analyzed as desired, and the process is complete. The synchronous communications resources for processor 20 are now available once again to any processor.

This example uses a number of mailbox commands and processor interrupt commands to handle a message and message response in multiple processors. Main storage does not need to be accessed to accomplish the communications in both directions, thereby resulting in a significant performance advantage.

Processor 10 to Processor 20 Asynchronous

Asynchronous communications is accomplished by defining a list of task control blocks stored in main storage 40 for each processor receiving asynchronous communication. Instead of an eight byte message being placed in message field 140 of a mailbox entry (FIG. 4), task control block header information is used. Specifically, message field segment 141 contains the beginning address of the task control block in main storage 40, and message field 142 contains the ending address of the task control block.

When processor 10 finds a task that needs to be executed asynchronously by processor 20, the task is put into a task control block in main memory 40. Processor 10 then issues a TEST AND SET LOCK AND READ MESSAGE command to the address of the mailbox entry reserved for asynchronous communications with processor 20. Processor 10 then checks if the lock has been obtained, and if so, uses the header data. Processor 10 then enqueues the task control block on processor 20's list, and uses the PROCESSOR INTERRUPT command to notify processor 20 if this enqueue is the first entry on the list. If this is not the first entry, the interrupt has already been set by convention. The list header is then updated in the mailbox entry and the lock reset with a RESET LOCK AND WRITE MESSAGE command. This completes processor 10's participation in asynchronous communication and frees up resources so that other processors may enqueue or dequeue tasks on processor 20's list.

When processor 20 detects the interrupt for asynchronous communication, the task control block header contained in the mailbox entry is again accessed by a TEST AND SET AND READ MESSAGE command. If the lock is obtained, processor 20 is allowed to dequeue list entries from the linked list. If it is not obtained, it can not dequeue asynchronous tasks.

When the lock is obtained, processor 20 dequeues the top entry from the list. If it is removing the last entry in its own list, the asynchronous communications interrupt is reset by using the PROCESSOR INTERRUPT command and addressing it's own interrupt bit. This must be done while the mailbox lock is held by processor 20 to maintain integrity of the list.

The task control block header is updated and the lock reset by using the RESET LOCK AND WRITE MESSAGE command. This completes processor 20's participation in the asynchronous communication and frees up the resources for other processors to enqueue more tasks on processor 20's list while it executes the task it just removed from the list.

This example uses a few mailbox commands in conjunction with processor interrupt commands to allow many processors to access individual work lists and pass work from one to another quickly and efficiently.

Service Processor 30 to Processor 20

The following shows how the invention could be used to satisfy an operator request to display main storage 40 starting at a specified address. The operator sends a request to the service processor 30, via keyboard input, to display sixty four bytes of main storage starting from a specified address. Service processor 30 first writes eight bytes of data to the message field of a mailbox entry in mailbox array portion 120 reserved for service processor 30 to processor 20 communications using the WRITE MESSAGE command. This data will include a predefined command instructing processor 20 to read from main storage 40, along with the main storage address.

Service processor 30 then sends a SERVICE PROCESSOR TO PROCESSOR INTERRUPT REQUEST from maintenance interface 32 to service processor interrupt registers 22 over bus 45 to processor 20. Service processor 30 then waits for a PROCESSOR TO SERVICE PROCESSOR INTERRUPT RESPONSE from processor 20 over bus 45.

When processor 20 detects the SERVICE PROCESSOR TO PROCESSOR INTERRUPT REQUEST, processor 20 issues a READ MESSAGE command to read the message contained in the mailbox entry. Processor 20 then inspects the message and deciphers that service processor 30 is requesting sixty four bytes of data starting from a specified main storage address.

Processor 20 reads the first eight bytes of data starting at the main storage address. It then transfers this data to the message field of the first mailbox entry in mailbox array portion 130 reserved for the use of service processor 30 via a WRITE MESSAGE command.

In the preferred embodiment, service processor 30 has several mailbox entries reserved for its use in mailbox array portion 130 to efficiently handle data transfers such as that described in this example.

Processor 20 then reads the next eight bytes from main storage 40 and writes this data to the message field of the second mailbox entry reserved for the use of service processor 30 in mailbox array portion 130 via another WRITE MESSAGE command. This process continues until all sixty four bytes have been read from main storage and transferred to subsequent mailbox entries in mailbox array portion 130.

Processor 20 then responds to service processor 30 by sending a PROCESSOR TO SERVICE PROCESSOR INTERRUPT RESPONSE via bus 45. Service processor 30 then reads the data contained in the message fields of its mailbox entries using several READ MESSAGE commands. Finally, service processor 30 outputs the requested sixty four bytes of data on the operator console.

While the invention has been described with respect to preferred and alternate embodiments, it will be understood by those skilled in the art that various changes in detail may be made therein without departing from the spirit, scope and teaching of the invention. Accordingly, the herein disclosed is to be limited only as specified in the following claims.

What is claimed is:

1. A communication system comprising:
    a first processor;
    a second processor;
    a first holding register dedicated and independently coupled to said first processor to receive from said first processor interrupt commands, write messages and read requests;
    a second holding register dedicated and independently coupled to said second processor to receive from said second processor interrupt commands, write messages and read requests, each of the holding registers receiving the respective interrupt commands, messages and requests independently of the interrupt commands, messages and requests received by the other holding register;
    a first interrupt storage register coupled and dedicated to said first processor to supply interrupts thereto, said interrupts being sent by said second processor to notify said first processor of a message sent by said second processor;
    a second interrupt storage register coupled and dedicated to said second processor to supply interrupts thereto, said interrupts being sent by said first processor to notify said second processor of a message sent by said first processor;
    mailbox means for storing a multiplicity of messages sent by said first and second processors, said messages being transmitted to said second and first processors, respectively, upon request by said second and first processors;
    decode means, coupled to said mailbox means and said first and second interrupt storage registers, for routing interrupt commands stored in said first and second holding registers to said second and first interrupt storage registers, respectively, routing messages from said first and second processors to said mailbox means, and processing read requests by directing said mailbox means to output the requested message to the requesting processor; and
    means, coupled between said holding registers and said decode means, for arbitrating access to said decode means between interrupt commands, messages, and requests stored in said first and second holding registers.

2. A system as set forth in claim 1 further comprising
    a service processor coupled to and serving both said first and second processors;
    a third holding register dedicated and independently coupled to said service processor to receive from said service processor write messages;
    means for transmitting interrupts from said service processor directly to said first and second processors bypassing said holding registers, and transmitting messages from said service processor to said third holding register, and wherein
    said decode means routes the service processor messages from said third holding register to said mailbox means, and processes requests by said first and second processors for the messages sent by said service processor by directing said mailbox means to output the requested message to the requesting processor; and
    the arbitration means arbitrates access to said decode means between interrupt commands, messages, and requests in said first and second holding registers and messages stored in said third holding register.

3. A system as set forth in claim 1 wherein each of said processors sends an address with each message and request, the address accompanying the message specifying a location in said mailbox means to store said message and the address accompanying the request specifying the location in said mailbox means from which to read the message.

4. A system as set forth in claim 3 wherein each of said processors sends a lock request for the specific mailbox address associated with a message, and said decode means sets a lock associated with said specific mailbox address if said specific mailbox address is available to enable said message to be written into said specific mailbox address.

* * * * *